UNITED STATES PATENT OFFICE.

HENRY C. FAHLBUSH, OF MARSHALL, ILLINOIS.

IMPROVEMENT IN PREVENTIVES AND REMEDIES FOR HOG-CHOLERA.

Specification forming part of Letters Patent No. 128,380, dated June 25, 1872.

Specification describing an improved method of determining, preventing, and curing the disease commonly known as "Hog Cholera," invented by HENRY C. FAHLBUSH, of Marshall, Clark county, Illinois.

The invention consists in the manner of determining the true nature of the disease commonly known as "hog cholera," and in providing a certain means of cure, or, if desired, a a mode of preventing hogs from taking said disease, even though they may be turned loose with hogs thus diseased.

The disease, in its true state, is nothing more than "rubeola" or black measles. This fact is determined by the appearance of the hog: first symptom, redness or inflammation about the forehead, shortness of breathing, feverishness, vomiting, and sometimes purging.

It has been found by examination of the hog after death that death was caused by the measles striking in and settling on the lungs. In all cases where hogs die of this disease their lungs will be found greatly inflamed, giving the appearance of a perfect mass of corruption, the entire lungs showing a dark venous color, and sometimes affecting the liver by enlarging and causing the blood to settle on it, something like it affects the lungs, only not to so great an extent.

The remedies used to prevent or cure the disease above described are as follows:

1. To prevent hogs from taking it I use a solution of asafœtida, or asafœtida and lime combined, mixed with water or swill, and administered at least once a day, oftener, if desirable.

2. Treatment when hogs are already affected: First, provide them with a dry pen, where they will be free from exposure to wind or rain, and be careful that the pen is kept perfectly clean, so that they have no opportunity to wallow in mud or water. Then the first object is to give such medicines as will act as a sudorific, allaying the inflammation on the lungs and liver, and causing the circulation of the blood to have a tendency outward, thus driving the measles to the surface. This is caused by using any medicine which is used as a sudorific. The principal ones used are either a decoction of smart-weed, a decoction of pennyroyal, or even soap-suds, used either separately or combined, giving the hogs all they will drink.

Claims.

I claim as my invention—

1. A solution of asafœtida and lime, to be administered in manner substantially as herein described.

2. A decoction of smart-weed and pennyroyal, either with or without soap-suds, employed as a sudorific, in combination with the remedial agent hereinbefore named, substantially in the manner described.

The foregoing specification signed by me this 8th day of November, A. D. 1871.

HENRY C. FAHLBUSH.

Witnesses:
M. D. HARE,
GEO. W. LAINGOR.